(12) United States Patent
Adler et al.

(10) Patent No.: US 11,498,373 B2
(45) Date of Patent: Nov. 15, 2022

(54) METHOD AND SYSTEM FOR DETERMINING TIRE SENSOR POSITION ON A VEHICLE USING PHASE SHIFT BASED RANGING

(71) Applicant: Continental Automotive Systems Inc., Auburn Hills, MI (US)

(72) Inventors: Aaron Adler, Rochester Hills, MI (US); Djordje Preradovic, Shelby Township, MI (US); Akshay Choudhari, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 235 days.

(21) Appl. No.: 16/729,598

(22) Filed: Dec. 30, 2019

(65) Prior Publication Data

US 2020/0384815 A1 Dec. 10, 2020

Related U.S. Application Data

(60) Provisional application No. 62/858,626, filed on Jun. 7, 2019.

(51) Int. Cl.
*B60C 23/04* (2006.01)
*H04L 67/12* (2022.01)
*H04W 4/40* (2018.01)
*H04W 4/80* (2018.01)

(52) U.S. Cl.
CPC ...... *B60C 23/0442* (2013.01); *B60C 23/0416* (2013.01); *B60C 23/0437* (2013.01); *H04L 67/12* (2013.01); *H04W 4/40* (2018.02); *H04W 4/80* (2018.02)

(58) Field of Classification Search
CPC ............ B60C 23/0442; B60C 23/0416; B60C 23/0437; B60C 23/0444; H04L 67/12; H04W 4/40; H04W 4/80; H04W 4/48; G01S 5/12
USPC ................................................. 340/447, 442
See application file for complete search history.

(56) References Cited

U.S. PATENT DOCUMENTS

| | | | | |
|---|---|---|---|---|
| 6,988,026 B2* | 1/2006 | Breed | ................... | G06V 30/194 701/33.9 |
| 7,467,034 B2* | 12/2008 | Breed | ................. | B60C 23/0408 701/29.6 |
| 7,944,348 B2* | 5/2011 | Watasue | ............... | B60C 23/0416 340/447 |
| 9,154,920 B2* | 10/2015 | O'Brien | ................ | H04W 4/027 |
| 9,950,577 B1* | 4/2018 | Marlett | ................... | H04W 4/40 |
| 10,093,138 B2* | 10/2018 | DeCia | ................. | B60C 23/0486 |
| 10,596,865 B2* | 3/2020 | Patel | ..................... | B60C 23/044 |

(Continued)

FOREIGN PATENT DOCUMENTS

CN 105774425 A * 7/2016

*Primary Examiner* — Eric Blount

(57) ABSTRACT

A system and method include, among other things, providing at least one vehicle transceiver and at least one tire information sensor for a tire on a vehicle and wirelessly communicating between the at least one vehicle transceiver and the at least one tire information sensor via a signal. A phase shift in the signal is determined and a physical distance between the at least one vehicle transceiver and the at least one tire information sensor is determined based on the phase shift. A position of the at least one tire information sensor within the vehicle is then determined based on the physical distance.

9 Claims, 2 Drawing Sheets

(56) References Cited

U.S. PATENT DOCUMENTS

| | | | |
|---|---|---|---|
| 2002/0102995 A1* | 8/2002 | Zelmanovich | H04W 64/00 |
| | | | 455/457 |
| 2012/0059551 A1* | 3/2012 | Juzswik | B60C 23/0437 |
| | | | 701/49 |
| 2019/0126694 A1* | 5/2019 | Stewart | B60C 23/0479 |

* cited by examiner

METHOD AND SYSTEM FOR DETERMINING TIRE SENSOR POSITION ON A VEHICLE USING PHASE SHIFT BASED RANGING

RELATED APPLICATIONS

This application claims priority to U.S. Provisional Application No. 62/858,626 filed on Jun. 7, 2019.

TECHNICAL FIELD

The present disclosure relates to a method and system for determining a tire sensor position on a vehicle, and more particularly to a method and system that determines the distance via phased based ranging.

BACKGROUND

Vehicles often include a Tire Pressure Monitoring System (TPMS), which is an electronic system that monitors tire air pressure and other tire characteristics. The TPMS reports real-time tire pressure information to a vehicle user via a graphic display, a gauge, or a warning light for example. The TPMS helps to avoid traffic accidents, improves fuel economy, and decreases tire wear through early recognition of an under or over inflated state of the tires. In one example, the TPMS comprises a direct TPMS that utilizes information sensors on each wheel, either internal or external. In one example, the sensors physically measure the tire pressure in each tire and report it to a vehicle control system. The sensors can also measure thread depth and tire temperature.

The tire information sensors may need to be replaced, the tires may need to be rotated, or a new tire may need to be installed on the vehicle. This can result in relocation of the tire information sensors within the vehicle. The control system needs to know the actual position of each information sensor within the vehicle for accurate reporting.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method according to an exemplary embodiment of this disclosure, includes, among other possible things: providing at least one vehicle transceiver and at least one tire information sensor for a tire on a vehicle; wirelessly communicating between the at least one vehicle transceiver and the at least one tire information sensor via a signal; determining a phase shift in the signal; determining a physical distance between the at least one vehicle transceiver and the at least one tire information sensor based on the phase shift; and determining a position of the at least one tire information sensor within the vehicle based on the physical distance.

In a further embodiment of the foregoing method, the at least one tire information sensor comprises a plurality of tire information sensors, and the method includes providing at least one tire information sensor for each tire on the vehicle that can wirelessly communicate with the at least one vehicle transceiver.

In a further embodiment of any of the foregoing methods, the at least one vehicle transceiver comprises a plurality of vehicle transceivers, and the method includes having each tire information sensor wirelessly communicate with each vehicle transceiver.

In a further embodiment of any of the foregoing methods, the plurality of vehicle transceivers comprises at least three vehicle transceivers, and the method includes determining the physical distance of each tire information sensor relative to each vehicle transceiver, and determining the position of each tire information sensor within the vehicle using the physical distances and trilateration.

In a further embodiment of any of the foregoing methods, the method includes: determining a first estimated distance between one tire information sensor and a first vehicle transceiver of the at least three vehicle transceivers that comprises a first circle representing all possible distances at a first radius extending from the first vehicle transceiver to the one tire information sensor, determining a second estimated distance between the one tire information sensor and the second vehicle transceiver of the at least three vehicle transceivers that comprises a second circle representing all possible distances at a second radius extending from the second vehicle transceiver to the one tire information sensor, determining a third estimated distance between the one tire information sensor and the third vehicle transceiver of the at least three vehicle transceivers that comprises a third circle representing all possible distances at a third radius extending from the third vehicle transceiver to the one tire information sensor, and identifying the actual position of the one tire information sensor in the vehicle as an intersection point between the first, second, and third circles.

In a further embodiment of any of the foregoing methods, the method includes providing wireless communication between each of the at least three vehicle transceivers and each of the tire information sensors.

In a further embodiment of any of the foregoing methods, wireless communication is provided via BT, BLE, or 2.4 GHZ ISM band wireless communications.

In a further embodiment of any of the foregoing methods, the at least one tire information sensor comprises a wireless tire information sensor.

A method according to another exemplary embodiment of this disclosure, includes, among other possible things: providing a plurality of vehicle transceivers on a vehicle including a plurality of tires; providing plurality of tire information sensors, wherein each tire includes at least one tire information sensor; wirelessly communicating between each of the plurality of vehicle transceivers and each of the plurality of tire information sensors via signals; determining a phase shift for each signal; determining a physical distance between each vehicle transceiver and each tire information sensor based on an associated phase shift; and determining a position of the plurality of tire information sensors within the vehicle based on the physical distances.

In a further embodiment of any of the foregoing methods, the method includes providing wireless communication between each vehicle transceiver and each tire information sensor.

In a further embodiment of any of the foregoing methods, wireless communication is provided via BT, BLE, or 2.4 GHZ ISM band wireless communications.

In a further embodiment of any of the foregoing methods, the plurality of vehicle transceivers comprises at least a first vehicle transceiver, a second vehicle transceiver, and a third vehicle transceiver, and wherein the plurality of tire information sensors comprises at least first, second, third, and fourth tire information sensors.

In a further embodiment of any of the foregoing methods, the method includes (a) determining a first distance between the first tire information sensor and the first vehicle transceiver that comprises a first circle representing all possible distances at a first radius extending from the first vehicle transceiver to the first tire information sensor, (b) determining a second distance between the first tire information sensor and the second vehicle transceiver that comprises a second circle representing all possible distances at a second radius extending from the second vehicle transceiver to the first tire information sensor, (c) determining a third distance between the first tire information sensor and the third vehicle transceiver that comprises a third circle representing all possible distances at a third radius extending from the third vehicle transceiver to the first tire information sensor, and (d) identifying the actual position of the first tire information sensor in the vehicle as an intersection point between the first, second, and third circles.

In a further embodiment of any of the foregoing methods, the method includes repeating steps (a) through (d) to determine the actual position of the second, third, and fourth tire information sensors in the vehicle.

A system according to another exemplary embodiment of this disclosure, includes, among other possible things, at least one vehicle transceiver and at least one tire information sensor for a tire on a vehicle, wherein the at least one vehicle transceiver and the at least one tire information sensor wirelessly communicate with each other via a signal. A control unit is configured to determine a phase shift in the signal, determine a physical distance between the at least one vehicle transceiver and the at least one tire information sensor based on the phase shift, and determine a position of the at least one tire information sensor within the vehicle based on the physical distance.

In a further embodiment of the foregoing system, the at least one vehicle transceiver comprises a plurality of vehicle transceivers and the at least one tire information sensor comprises a plurality of tire information sensors, and wherein wireless communication takes place between each vehicle transceiver and each tire information sensor.

In a further embodiment of any of the foregoing systems, the plurality of vehicle transceivers comprises at least a first vehicle transceiver, a second vehicle transceiver, and a third vehicle transceiver, and wherein the plurality of tire information sensors comprises at least first, second, third, and fourth tire wireless information sensors.

In a further embodiment of any of the foregoing systems, the control unit determines the physical distance of each of the first, second, third, and fourth wireless tire information sensors relative to each of the first, second, and third vehicle transceivers, and determines the position of each of the first, second, third, and fourth wireless tire information sensors within the vehicle using the physical distances and trilateration.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
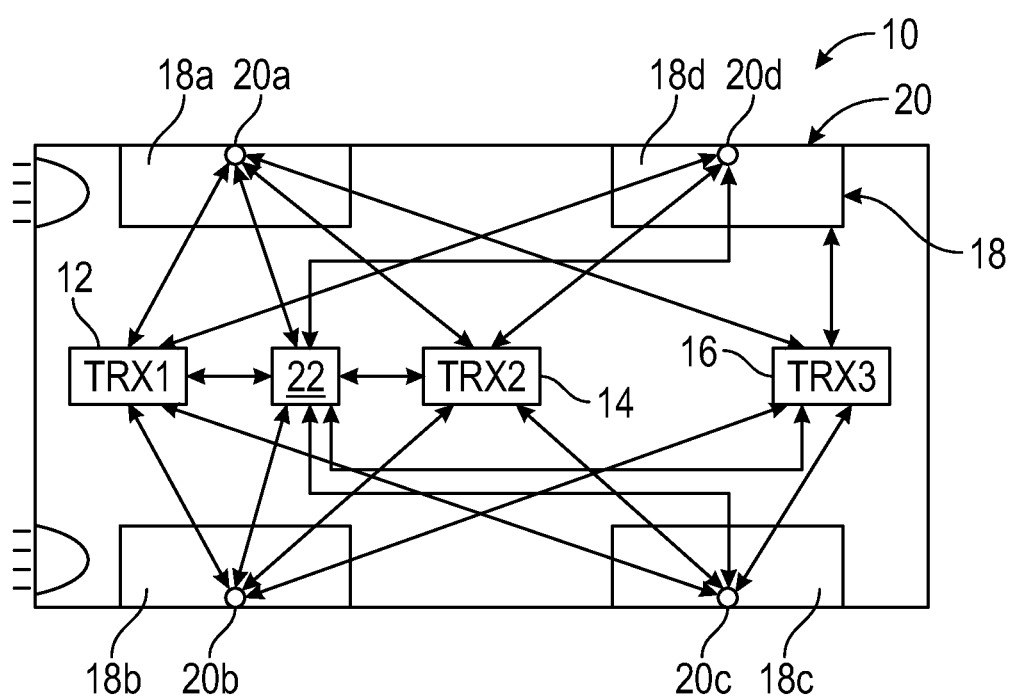
FIG. 1 is a schematic overhead view of a vehicle with a tire information monitoring system.

The subject disclosure relates to a TPMS that includes at least one transceiver that wirelessly communicates with one or more tire information sensors to determine locations of the sensors within the vehicle. In one example shown in FIG. 1, a vehicle 10 includes a TPMS that has at least a first vehicle transceiver 12, a second vehicle transceiver 14, and a third vehicle transceiver 16. The first 12, second 14, and third 16 vehicle transceivers can be placed anywhere within the vehicle 10, outside of the vehicle 10, or in any combination thereof. Additional transceivers can also be installed as needed.

The vehicle 10 also includes a plurality of tires 18 that have individual tire air pressures that are monitored by tire information sensors 20 of the TPMS. In one example, a front right sensor 20a is used for a front right tire 18a, a front left sensor 20b is used for a front left tire 18b, a rear left sensor 20c is used for a rear left tire 18c, and a rear right sensor 20d is used for a rear right tire 18d. The sensors 20a, 20b, 20c, 20d measure at least tire air pressure and communicate pressure data to a controller or electronic control unit 22. An additional sensor for a spare tire may also be included. In addition to measuring air pressure, the sensors may measure tread depth or tire temperature, for example. The vehicle may also include fewer or additional tires/sensors depending upon the type of vehicle, e.g. motorcycle, car, truck, tractor/trailer, etc.

In one example, the sensors 20a, 20b, 20c, 20d are wireless, e.g. Blue Tooth (BT), tire information sensors and the transceivers 12, 14, 16 are wireless, e.g. BT, transceivers (TRX) that communicate with the sensors 20a, 20b, 20c, 20d. Bi-directional and/or unidirectional communications between the sensors 20a, 20b, 20c, 20d and the first 12, second 14, and third 16 vehicle transceivers are used to determine respective distances between the transceivers 12, 14, 16 and the respective sensors 20a, 20b, 20c, 20d. In one example, the communications are wireless communications that are accomplished via BT, Bluetooth Low Energy (BLE), or a 2.4 GHZ Industrial, Scientific and Medical (ISM) band wireless channel.

The control unit 22 uses the distance data to determine an actual position of the sensors 20a, 20b, 20c, 20d within the vehicle 10 via trilateration, for example. In other words, the control unit 22 uses the distance data to identify the sensors that are associated with each tire, e.g. front right, front left, rear left, rear right. The control unit 22 can be incorporated as part of one of the first 12, second 14, and third 16 vehicle transceivers, or the control unit 22 can be a vehicle control unit or a separate/dedicated control unit. The sensors 20a, 20b, 20c, 20d may also include a sensor control unit or microcontroller that is in communication with the control unit 22.

The distances between each of the sensors 20a, 20b, 20c, 20d and the transceivers 12, 14, 16 can be accomplished using phase shift measurements. During communication between the sensors 20a, 20b, 20c, 20d and the transceivers 12, 14, 16, phase shifts are recorded and converted to physical distances in units such as feet or meters, for example. The control unit 22 collects and records the distances between the sensors 20a, 20b, 20c, 20d and the transceivers 12, 14, 16. The distance recordings are then used in a mathematical equation to determine a position of each sensor 20a, 20b, 20c, 20d in reference to the vehicle 10, e.g. identifies the front right sensor 20a, the front left sensor 20b, the rear left sensor 20c, and the rear right sensor 20d.

In phase shift distance determination, the distance between each sensor 20a, 20b, 20c, 20d and each transceiver 12, 14, 16 is estimated by using phase-shift measurements of RF signals over multiple frequencies. In one example, the control unit 22 uses the distances to determine the actual position of each of the sensors 20a, 20b, 20c, 20d within the vehicle 10 via trilateration, for example. In another example, the distance can be a predetermined reference distance (measured during development and stored as a reference) from the front left, front right, rear left, and/or rear right to at least one of the transceivers.

Figure 2:
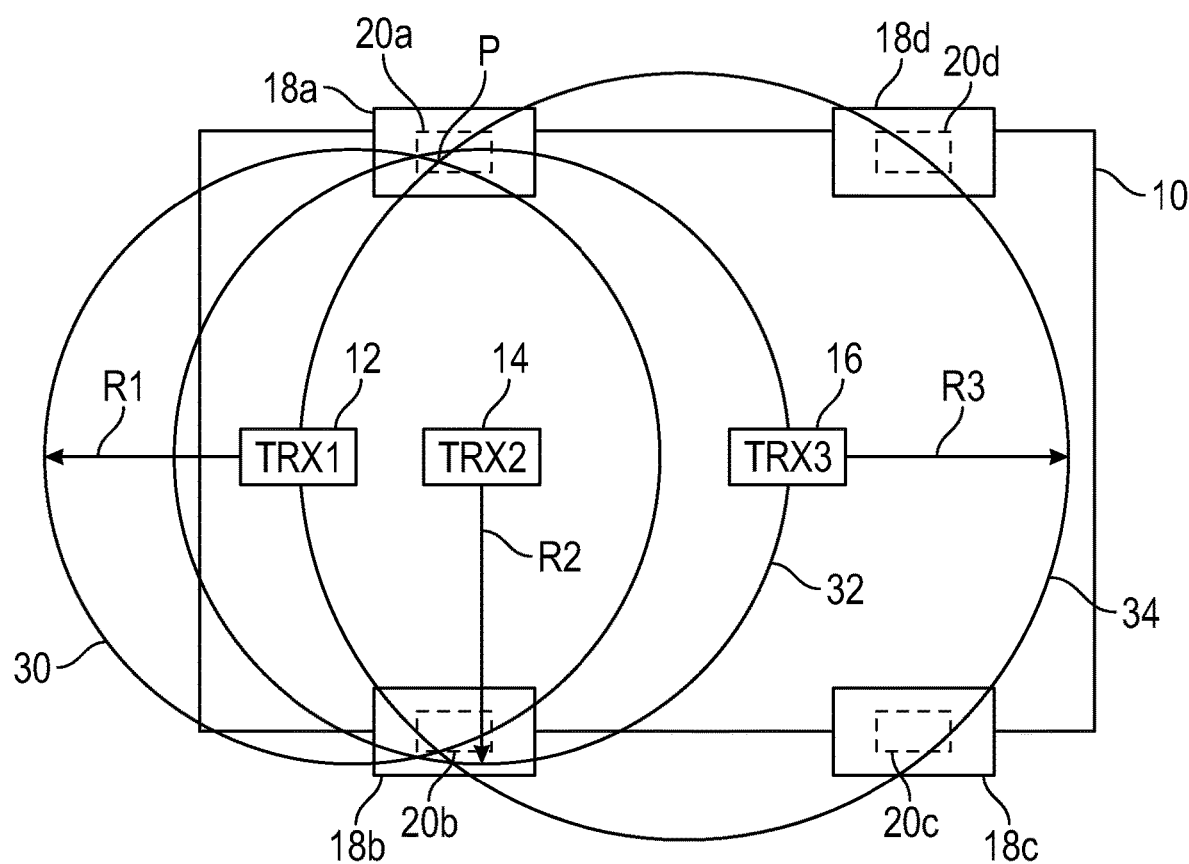
FIG. 2 shows using trilateration as one example to determine an actual position of a tire information sensor within a vehicle.

FIG. 2 shows an example of determining the position of the front right sensor 20a within the vehicle 10 using trilateration. The distance between the front right sensor 20a and the first vehicle transceiver 12 comprises a first circle 30 representing all possible distances at a first radius R1 extending from the first vehicle transceiver 12 to the front right sensor 20a. The distance between the front right sensor 20a and the second vehicle transceiver 14 comprises a second circle 32 representing all possible distances at a second radius R2 extending from the second vehicle transceiver 14 to the front right sensor 20a. The distance between the front right sensor 20a and the third vehicle transceiver 16 comprises a third circle 34 representing all possible distances at a third radius R3 extending from the third vehicle transceiver 16 to the front right sensor 20a. The actual position of the front right sensor 20a within the vehicle 10 is then identified as an intersection point P between the first 30, second 32, and third 34 circles. Based on the determined position, the control unit 22 can then identify that the front right sensor 20a is at the front right tire 18a.

The control unit 22 uses trilateration to determine the position of the other remaining sensors 20b, 20c, 20d. If, for example, the tires 18 are rotated, then the sensor locations will change with the tires. Once the communication between the sensors 20a, 20b, 20c, 20d and the transceivers 12, 14, 16 is initiated after tire rotation, the control unit 22 will automatically be able to identify which sensor is now positioned at the front right tire location using the trilateration process detailed above. The control unit 22 will also be able to determine the locations of the remaining sensors at the other tire locations.

An example of how the intersection point P is determined is discussed below. In this example, a 2D model is used based on x-y coordinates as an alternative to longitude/latitude coordinates. Each transceiver 12, 14, 16 is at a center of its respective circle 30, 32, 34, with the center being defined by the x-y coordinates. The first circle 30 has first coordinates $(x_1, y_1)$, the second circle 32 has second coordinates $(x_2, y_2)$, and the third circle 34 has third coordinates $(x_3, y_3)$. The first sensor 20a has the intersection coordinates (x, y) at the intersection point P.

The three equations for the three circles are as follows:

$$(x-x_1)^2+(y-y_1)^2=r_1^2$$

$$(x-x_2)^2+(y-y_2)^2=r_2^2$$

$$(x-x_3)^2+(y-y_3)^2=r_3^2$$

Next, the squares are expanded out for each equation:

$$x^2-2x_1x+x_1^2+y^2-2y_1y+y_1^2=r_1^2$$

$$x^2-2x_2x+x_2^2+y^2-2y_2y+y_2^2=r_2^2$$

$$x^2-2x_3x+x_3^2+y^2-2y_3y+y_3^2=r_3^2$$

Next, the second equation is subtracted from the first equation:

$$(-2x_1+2x_2)x+(-2y_1+2y_2)y=r_1^2-r_2^2-x_1^2+x_2^2-y_1^2+y_2^2$$

Next, the third equation is subtracted from the second equation:

$$(-2x_2+2x_3)x+(-2y_2+2y_3)y=r_2^2-r_3^2-x_2^2+x_3^2-y_2^2+y_3^2$$

Next, these two equations are rewritten using A, B, C, D, E, F values to result in the following system of 2 equations:

$$Ax+By=C$$

$$Dx+Ey=F$$

The solution of the system is:

$$x=\frac{CE-FB}{EA-BD}$$

$$y=\frac{CD-AF}{BD-AE}$$

These equations can then be implemented in an algorithm, such as a Python algorithm for example, using a function that will take the nine parameters ($x_1$, $y_1$, $r_1$, $x_2$, $y_2$, $r_2$, $x_3$, $y_3$, $r_3$) and return the (x,y) coordinates of the intersection point P of the three circles. In one example, the control unit 20 is utilized to execute the algorithm.

In one example, the control unit 22 or system controller can include a processor, memory, and one or more input and/or output (I/O) device interface(s) that are communicatively coupled via a local interface. The local interface can include, for example but not limited to, one or more buses and/or other wired or wireless connections. The controller may be a hardware device for executing software, particularly software stored in memory. The controller can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. The controller can be configured to execute software stored within the memory, to communicate data to and from the memory, and to generally control operations of the computing device pursuant to the software. Software in memory, in whole or in part, is read by the processor, perhaps buffered within the processor, and then executed.

The subject disclosure provides a tire information system that determines accurate positions of tires/sensors on a vehicle. Example applications to which this disclosure is applicable include: new tire/wheel installation, new position of a tire, new sensor installation, new position of a sensor, factory position learning process, identifying tire/wheel position on car, tire rotation, relearn new positions of rotated tires, etc. An exemplary system comprises multiple BT personal area wireless network transceivers disposed about the vehicle and BT tire information sensors disposed about the tires. The tire information sensors wirelessly communicate with the transceivers via BT, BLE, 2.4 GHZ ISM band wireless communications, or otherwise.

During the communication between sensors and transceivers, phase shifts in the signals are recorded and converted to physical distance measurements that are collected and recorded by the control unit. These distance recordings are used to determine tire/sensor position (Front Left, Front Right, Rear Left and Rear Right) using trilateration, for example. The method and system use a more accurate phase based ranging instead of or in addition to other ranging methods, e.g. Received Signal Strength Indicator (RSSI), or time stamp based Time of Flight (TOF).

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method comprising:
   providing at least one vehicle transceiver and at least one tire information sensor for a tire on a vehicle;
   wirelessly communicating between the at least one vehicle transceiver and the at least one tire information sensor via a signal;
   determining a phase shift in the signal;
   determining a physical distance between the at least one vehicle transceiver and the at least one tire information sensor based on the phase shift;
   determining a position of the at least one tire information sensor within the vehicle based on the physical distance;
   wherein the at least one tire information sensor comprises a plurality of tire information sensors, and including providing at least one tire information sensor for each tire on the vehicle that can wirelessly communicate with the at least one vehicle transceiver;
   wherein the at least one vehicle transceiver comprises a plurality of vehicle transceivers, and including having each tire information sensor wirelessly communicate with each vehicle transceiver; and
   wherein the plurality of vehicle transceivers comprises at least three vehicle transceivers, and including determining the physical distance of each tire information sensor relative to each vehicle transceiver, and determining the position of each tire information sensor within the vehicle using the physical distances and trilateration; and
   providing wireless communication between each of the at least three vehicle transceivers and each of the tire information sensors.

2. The method according to claim 1, including:
   determining a first estimated distance between one tire information sensor and a first vehicle transceiver of the at least three vehicle transceivers that comprises a first circle representing all possible distances at a first radius extending from the first vehicle transceiver to the one tire information sensor,
   determining a second estimated distance between the one tire information sensor and the second vehicle transceiver of the at least three vehicle transceivers that comprises a second circle representing all possible distances at a second radius extending from the second vehicle transceiver to the one tire information sensor,
   determining a third estimated distance between the one tire information sensor and the third vehicle transceiver of the at least three vehicle transceivers that comprises a third circle representing all possible distances at a third radius extending from the third vehicle transceiver to the one tire information sensor, and
   identifying the actual position of the one tire information sensor in the vehicle as an intersection point between the first, second, and third circles.

3. The method according to claim 1, wherein wireless communication is provided via BT, BLE, or 2.4 GHZ ISM band wireless communications.

4. The method according to claim 3, wherein the at least one tire information sensor comprises a wireless tire information sensor.

5. A method comprising:
   providing a plurality of vehicle transceivers on a vehicle including a plurality of tires;
   providing plurality of tire information sensors, wherein each tire includes at least one tire information sensor;
   wirelessly communicating between each of the plurality of vehicle transceivers and each of the plurality of tire information sensors via signals;
   determining a phase shift for each signal;
   determining a physical distance between each vehicle transceiver and each tire information sensor based on an associated phase shift;
   determining a position of the plurality of tire information sensors within the vehicle based on the physical distances;
   providing wireless communication between each vehicle transceiver and each tire information sensor;
   wherein the plurality of vehicle transceivers comprises at least a first vehicle transceiver, a second vehicle transceiver, and a third vehicle transceiver, and
   wherein the plurality of tire information sensors comprises at least first, second, third, and fourth tire information sensors; and
   (a) determining a first distance between the first tire information sensor and the first vehicle transceiver that comprises a first circle representing all possible distances at a first radius extending from the first vehicle transceiver to the first tire information sensor,
   (b) determining a second distance between the first tire information sensor and the second vehicle transceiver that comprises a second circle representing all possible distances at a second radius extending from the second vehicle transceiver to the first tire information sensor,
   (c) determining a third distance between the first tire information sensor and the third vehicle transceiver that comprises a third circle representing all possible distances at a third radius extending from the third vehicle transceiver to the first tire information sensor, and (d) identifying the actual position of the first tire information sensor in the vehicle as an intersection point between the first, second, and third circles.

6. The method according to claim 5, wherein wireless communication is provided via BT, BLE, or 2.4 GHZ ISM band wireless communications.

7. The method according to claim 5, including repeating steps (a) through (d) to determine the actual position of the second, third, and fourth tire information sensors in the vehicle.

8. A system comprising:
at least one vehicle transceiver;
at least one tire information sensor for a tire on a vehicle, wherein the at least one vehicle transceiver and the at least one tire information sensor wirelessly communicate with each other via a signal; and
a control unit configured to determine a phase shift in the signal, determine a physical distance between the at least one vehicle transceiver and the at least one tire information sensor based on the phase shift, and determine a position of the at least one tire information sensor within the vehicle based on the physical distance;
wherein the at least one vehicle transceiver comprises a plurality of vehicle transceivers and the at least one tire information sensor comprises a plurality of tire information sensors, and wherein wireless communication takes place between each vehicle transceiver and each tire information sensor;
wherein the plurality of vehicle transceivers comprises at least a first vehicle transceiver, a second vehicle transceiver, and a third vehicle transceiver, and
wherein the plurality of tire information sensors comprises at least first, second, third, and fourth tire wireless information sensors; and
wherein the control unit determines the physical distance of each of the first, second, third, and fourth wireless tire information sensors relative to each of the first, second, and third vehicle transceivers, and determines the position of each of the first, second, third, and fourth wireless tire information sensors within the vehicle using the physical distances and trilateration.

9. The system according to claim 8, wherein wireless communication is provided via BT, BLE, or 2.4 GHZ ISM band wireless communications.

* * * * *